US007251808B2

(12) United States Patent
Bates et al.

(10) Patent No.: US 7,251,808 B2
(45) Date of Patent: Jul. 31, 2007

(54) GRAPHICAL DEBUGGER WITH LOADMAP DISPLAY MANAGER AND CUSTOM RECORD DISPLAY MANAGER DISPLAYING USER SELECTED CUSTOMIZED RECORDS FROM BOUND PROGRAM OBJECTS

(75) Inventors: Cary Lee Bates, Rochester, MN (US); David Rajkumar Bhaskaran, Rochester, MN (US); Anthony Dwight Cairns, Rochester, MN (US); Paul Saby Halverson, Byron, MN (US); Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 10/660,034

(22) Filed: Sep. 11, 2003

(65) Prior Publication Data

US 2005/0060689 A1    Mar. 17, 2005

(51) Int. Cl.
*G06F 9/44* (2006.01)
(52) U.S. Cl. .................. 717/125; 717/129; 704/35; 712/234
(58) Field of Classification Search ............... 717/124, 717/127, 131, 125, 129; 704/35; 712/234
See application file for complete search history.

(56) References Cited

U.S. PATENT DOCUMENTS

| | | | |
|---|---|---|---|
| 5,787,245 A * | 7/1998 | You et al. ..................... 714/38 |
| 5,815,653 A * | 9/1998 | You et al. ..................... 714/38 |
| 6,000,028 A * | 12/1999 | Chernoff et al. ............ 712/226 |
| 6,158,045 A * | 12/2000 | You ............................ 717/124 |
| 6,282,663 B1 * | 8/2001 | Khazam ...................... 713/320 |
| 6,353,923 B1 * | 3/2002 | Bogle et al. ................ 717/128 |
| 6,412,106 B1 * | 6/2002 | Leask et al. ................ 717/124 |
| 6,539,390 B1 * | 3/2003 | Kiczales et al. ............ 707/101 |
| 6,728,949 B1 * | 4/2004 | Bryant et al. ............... 717/127 |
| 6,795,962 B1 * | 9/2004 | Hanson ....................... 717/129 |
| 6,961,926 B2 * | 11/2005 | Koyama ..................... 717/129 |
| 6,961,930 B1 * | 11/2005 | Waldspurger et al. ...... 717/141 |

OTHER PUBLICATIONS

"How Debuggers Work Algorithms, Data Structures and Architectures", Jonathan B. Rosenberg, 1996, Whole manual.*
A Thread-Aware Debugger with an Open Interface, Daniel Schult et al, ACM, 2000, pp. 201-211.*

* cited by examiner

*Primary Examiner*—Todd Ingberg
(74) *Attorney, Agent, or Firm*—Joan Pennington

(57) ABSTRACT

Enhanced graphical user interface functions are provided in a graphical debugger. A user interface operatively controls a graphical user interface. A loadmap display manager coupled to the user interface implements a loadmap function. The user interface responsive to the loadmap display manager displays a program loadmap. A custom record display manager coupled to the user interface receives user inputs and implements a custom record display function. The user interface responsive to the custom record display manager displays user selected customized records.

21 Claims, 15 Drawing Sheets

GRAPHICAL DEBUGGER WITH LOADMAP
DISPLAY MANAGER AND CUSTOM
RECORD DISPLAY MANAGER DISPLAYING
USER SELECTED CUSTOMIZED RECORDS
FROM BOUND PROGRAM OBJECTS

FIELD OF THE INVENTION

The present invention relates generally to the data processing field, and more particularly, relates to a method, apparatus, and computer program product for implementing enhanced graphical user interface functions in a graphical debugger.

DESCRIPTION OF THE RELATED ART

An important aspect of the design and development of a computer program is a process known as debugging. A computer programmer to locate and identify errors in a program under development performs debugging. Typically, a programmer uses another computer program commonly known as a debugger to debug a program under development.

A problem with known debuggers is that some useful and often needed information for a user is not available from a graphical user interface (GUI) of the available debuggers. Most Unix style debuggers display a flat list of source files that are in the program being debugged. Although this is very useful, sometimes the programmer needs additional data that cannot be displayed with known debuggers.

For example, some programs can dynamically load object files and object archives at run time. For programs that dynamically bind to program objects, the information about these objects is stored in what is commonly called a loadmap. Today the only other way to discern this information would be to examine make files, or to dump the debug data of the individual object files or archives with an external dumping tool.

A need exists for an improved debugger having a mechanism when debugging such programs enabling display for the programmer of what objects are in each part of the loadmap and the source files that correlate to these objects.

Another problem with known debuggers is that when records or variable structures are displayed, either all or none of the fields of the records are displayed by the conventional graphical user interface (GUI) of the available debuggers. Often the programmer or user is interested only one or a subset of the fields that are displayed. For example, consider an abstract sting type that may contain a field for the length, the character encoding, and a pointer to the string buffer. During debug sessions, the user often is only interested in the contents of the string buffer.

A need exists for a an improved debugger having a mechanism when debugging programs to provide custom record displays, where only user selected fields of records or variables are displayed.

SUMMARY OF THE INVENTION

One aspect of the present invention is to provide a method, apparatus, and computer program product for implementing enhanced graphical user interface functions in a graphical debugger. Other important aspects of the present invention are to provide such method, apparatus and computer program product substantially without negative effect and that overcome many of the disadvantages of prior art arrangements.

In brief, a method, apparatus and computer program product are provided for implementing enhanced graphical user interface functions in a graphical debugger. A user interface operatively controls a graphical user interface. A loadmap display manager coupled to the user interface implements a loadmap function. The user interface responsive to the loadmap display manager displays a program loadmap. A custom record display manager coupled to the user interface receives user inputs and implements a custom record display function. The user interface responsive to the custom record display manager displays user selected customized records.

In accordance with features of the invention, to generate the program loadmap, the loadmap display manager reads debug data for a program under debug. The loadmap display manager examines the program debug data, generates a list of each source and disassembly file that the program contains, and generates lists of each object or archive program bound to the program under debug at run time. The generated program loadmap is sent to the GUI for display. The loadmap display manager identifies program load and unload events, and dynamically updates the program loadmap display as the loadmap information changes. Using the program loadmap display of the invention enables setting a breakpoint within a user selected address range or one instance of a source file, without setting the breakpoint in other instances of the source file.

In accordance with features of the invention, custom record display manager identifies a user selected variable, and user selected fields of the variable to be displayed. If the user selects all variables of this type to be customized, then a custom record with the user selected fields is created and added to a custom type list. Then all variables of this type are displayed only with the user selected fields. Otherwise, a custom record with the user selected fields is created and added to a variables list and the variable is displayed only with the user selected fields.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
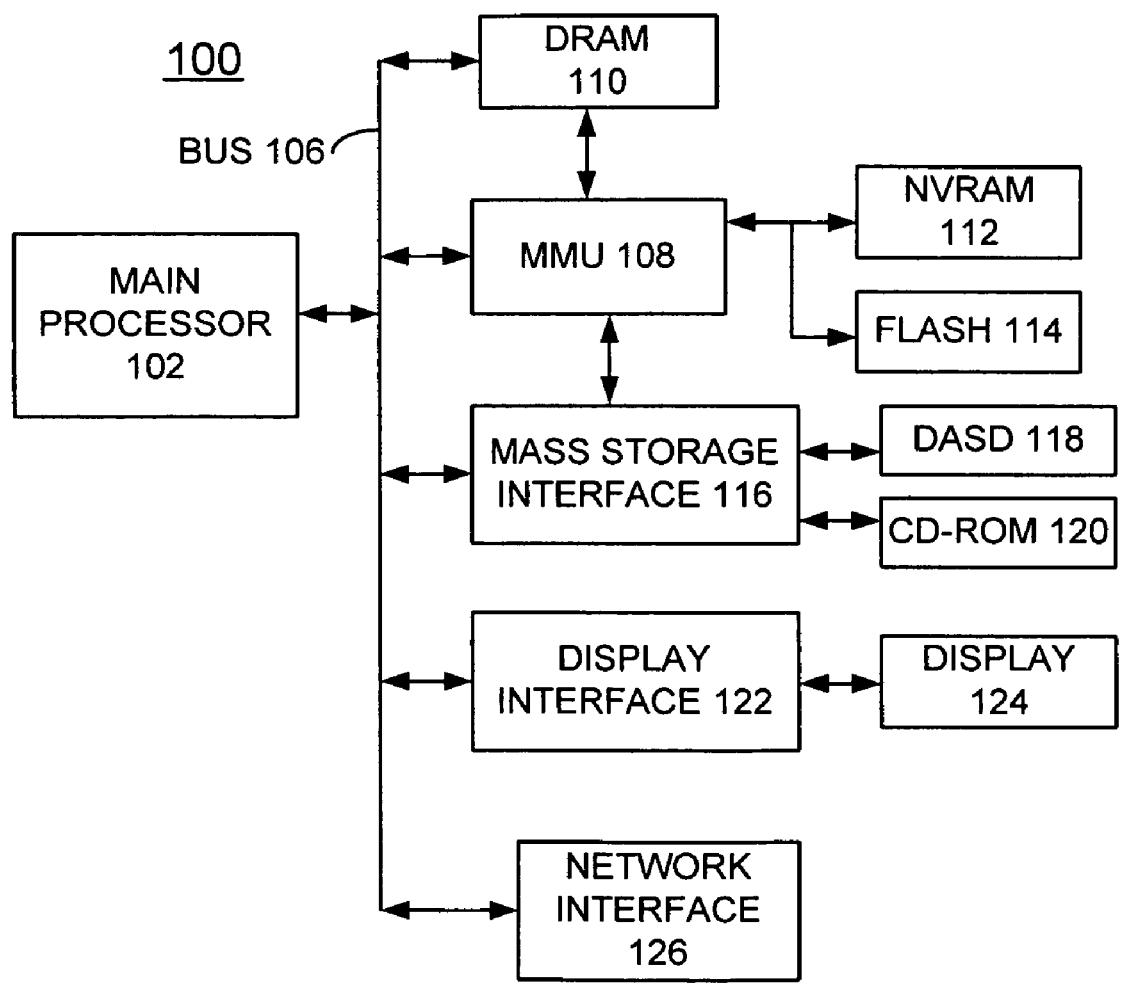
FIGS. 1A and 1B are block diagram representations illustrating a computer system and operating system for implementing an enhanced user interface in a graphical debugger in accordance with the preferred embodiment.
Figure 1B:
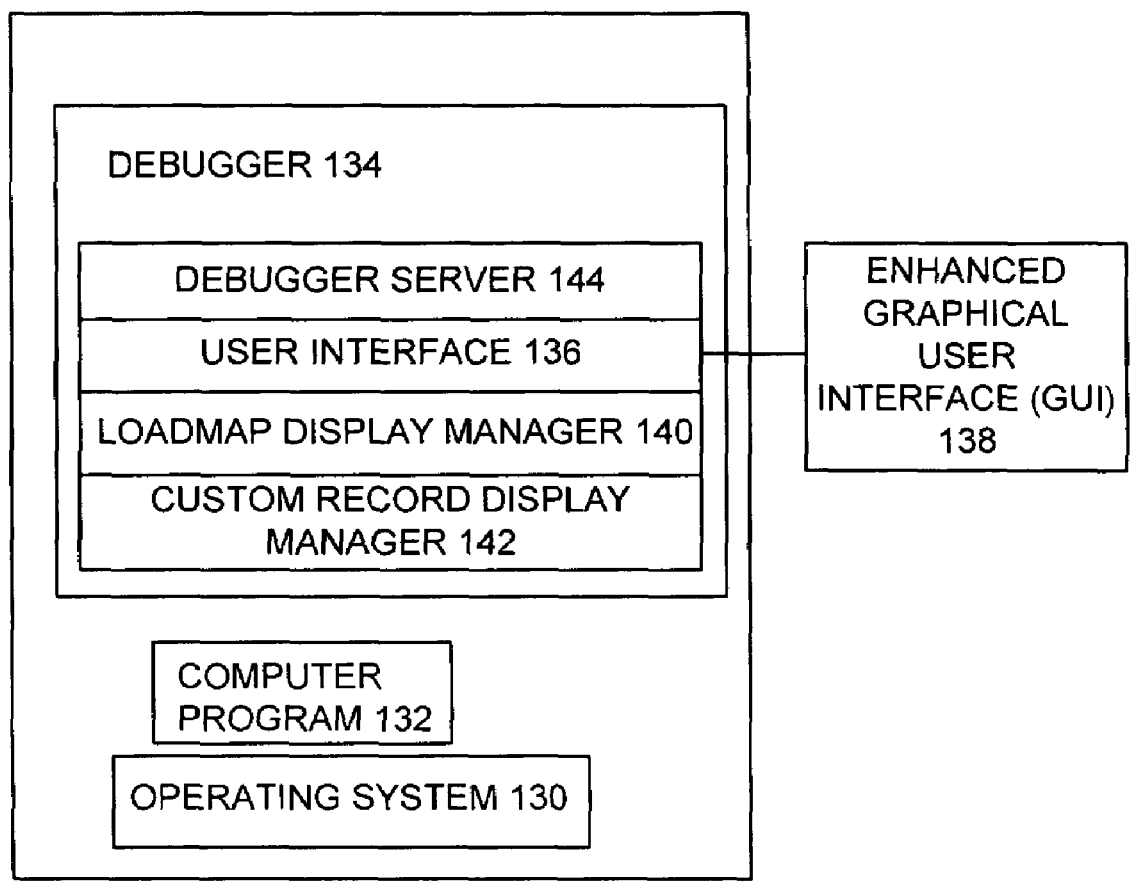

Referring now to the drawings, in FIGS. 1A and 1B there is shown a computer system generally designated by the reference character 100 for implementing enhanced graphical user interface functions in a graphical debugger in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a network interface 126 coupled to the system bus 106.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 1B, computer system 100 includes an operating system 130, a computer program 132, and a source level debugger 134. The source level debugger 134 includes a user interface 136 coupled to and operatively controlling an enhanced graphical user interface (GUI) 138 of the preferred embodiment, a loadmap display manager 140 of the preferred embodiment, a custom record display manager 142 of the preferred embodiment, and a debugger server 144. While separately shown, the loadmap display manager 140 and custom record display manager 142 could be implemented as integral functions within the debugger server 144. The enhanced graphical user interface (GUI) 138 operatively controlled by the user interface 136 displays loadmap and custom record features of the preferred embodiment.

Figure 4:
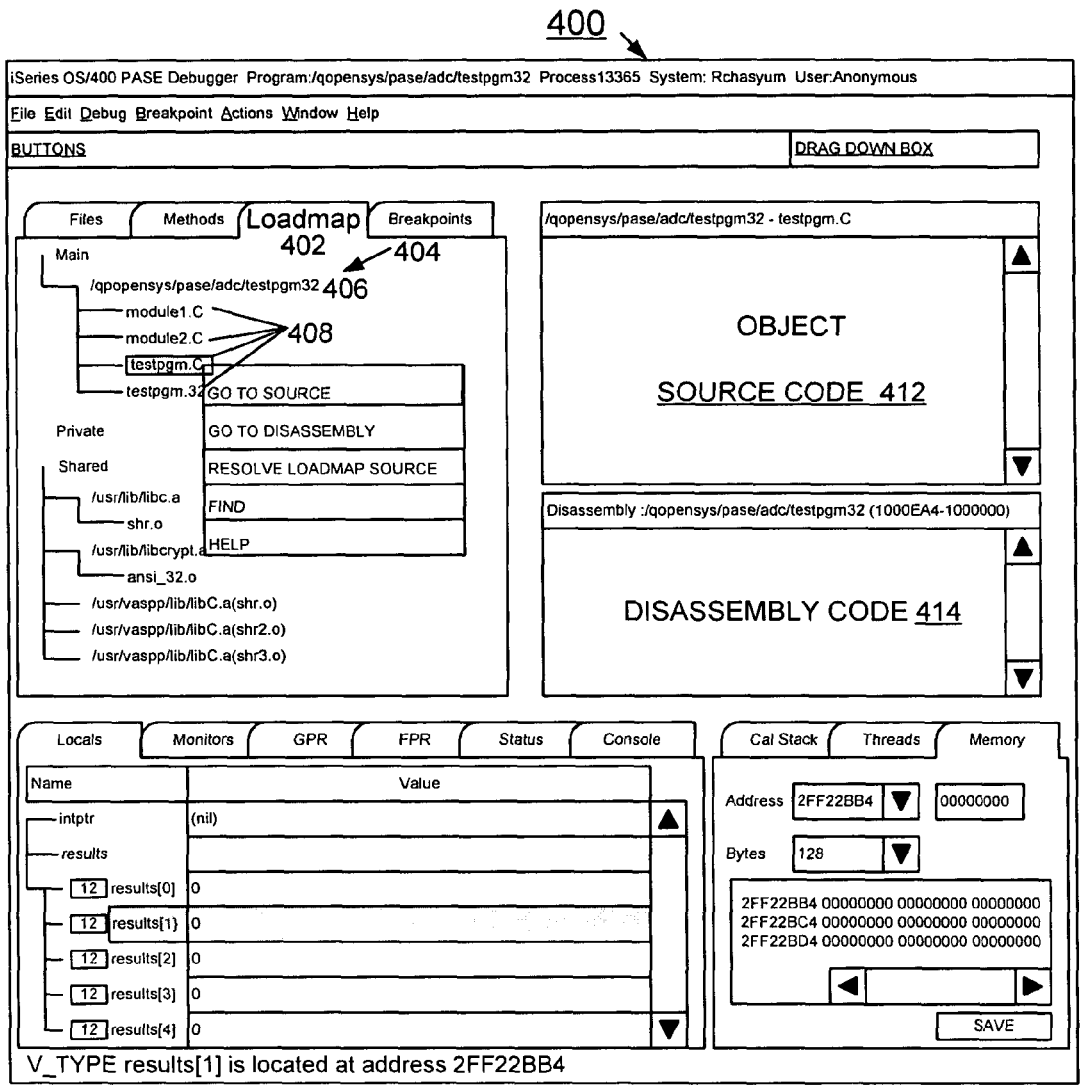
FIG. 4 illustrates an exemplary graphical user interface including the loadmap function in accordance with the preferred embodiment.

In accordance with features of the preferred embodiment, loadmap display manager 140 implements a new loadmap function and a new loadmap tab, such as loadmap tab 402 illustrated and described with respect to FIG. 4, is added to the enhanced GUI 138 to display a program loadmap and dynamically update the program loadmap display as the program loadmap changes as programs are loaded or unloaded. Custom record display manager 142 allows the user to program the user interface 136 to remember which fields of a given variable type or variable to be sent to the enhanced GUI 138 for display. Then whenever a variable of the particular type or the record is encountered, the enhanced GUI 138 initially displays only the user-selected or user-programmed fields for the variable or the record.

Various commercially available computers can be used for computer system 100; for example, an eServer® iSeries® computer system manufactured and sold by International Business Machines Corporation and processor 102 can be implemented, for example, by one of a line of IBM® PowerPC® processors manufactured and sold by International Business Machines Corporation. Central processor unit 102 is suitably programmed to execute the flowchart of FIGS. 2A, 2B, and 3 to generate a loadmap function and generate the enhanced GUI loadmap display screen of FIG. 4 of the preferred embodiment and to execute the flowchart of FIGS. 5-10 to generate custom display records and generate the enhanced GUI custom record display screens of FIGS. 11 and 12 of the preferred embodiment.

In accordance with features of the preferred embodiment, the debugger enhanced GUI 138 shows the topography of the program and which source files have been bound into which objects. The loadmap function is extremely important when debugging code that the user did not write or that is not familiar to the user. Unix allows binding modules with the same name into several different archives; and to have the same name source file appear in different modules or archives. These sources files may or may not contain the same source code. Thus it is very important to be able to graphically sort out which source files appear in which archives and object files, as provided by the debugger GUI 138 of the preferred embodiment.

In accordance with features of the preferred embodiment, the loadmap display manager 140 operatively controls the debugger server 142 for examining the program debug data to get lists of all the object files and archives to which the program under debug is bound. The loadmap display manager 140 operatively controls the debugger server 142 to make a list of each source and disassembly file that the program contains. This information is sent back to the user interface 136 for display on the enhanced GUI 138 of the preferred embodiment. The loadmap display manager 140 operatively controls the debugger server 142 to listen for program load and unload events, and dynamically send current loadmap information to the user interface 136 for display on the enhanced GUI 138 as the loadmap information changes.

Figure 2A:
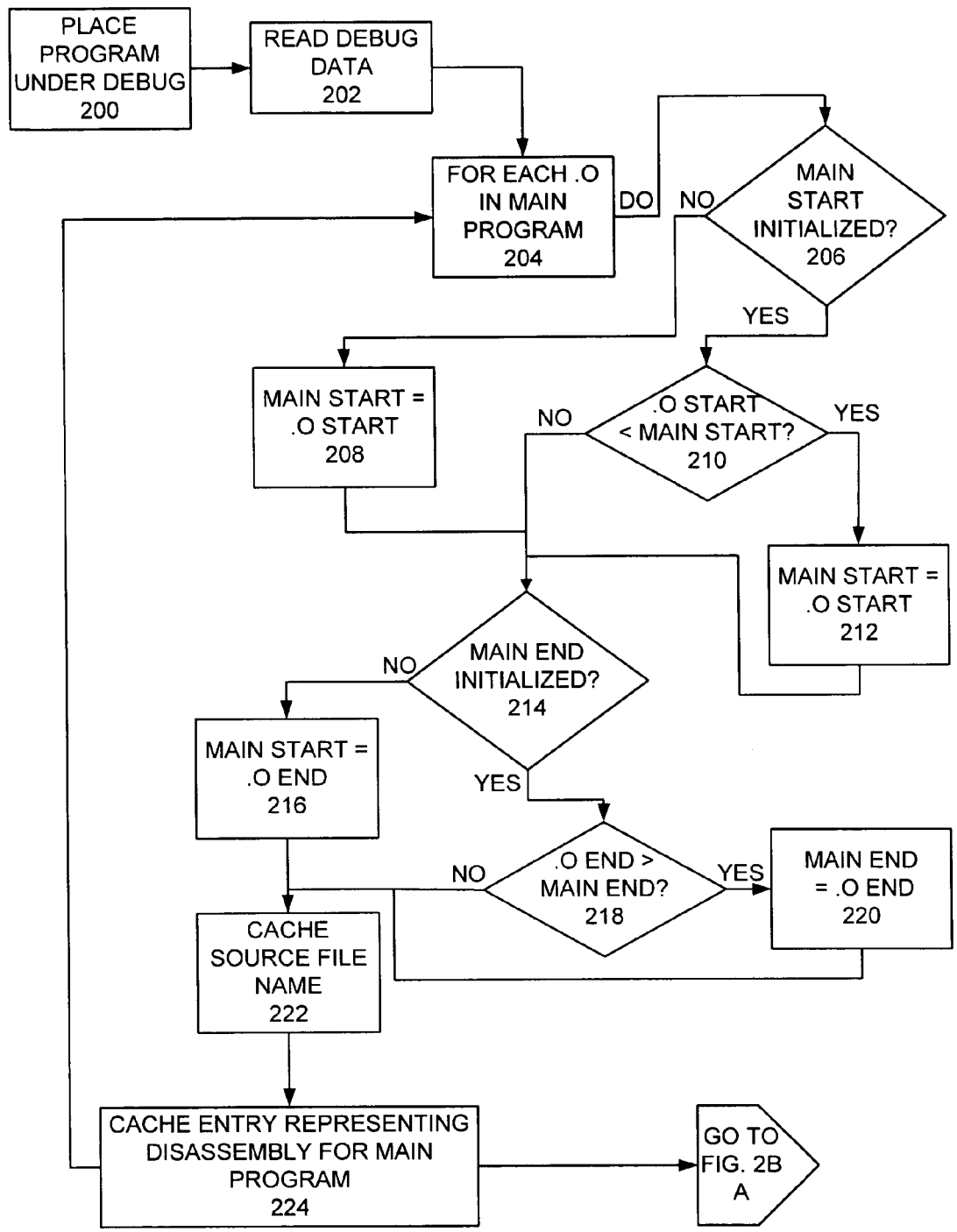
FIGS. 2A, 2B and 3 are flow charts illustrating exemplary steps for implementing a loadmap function of the enhanced user interface in accordance with the preferred embodiment.
Figure 2B:
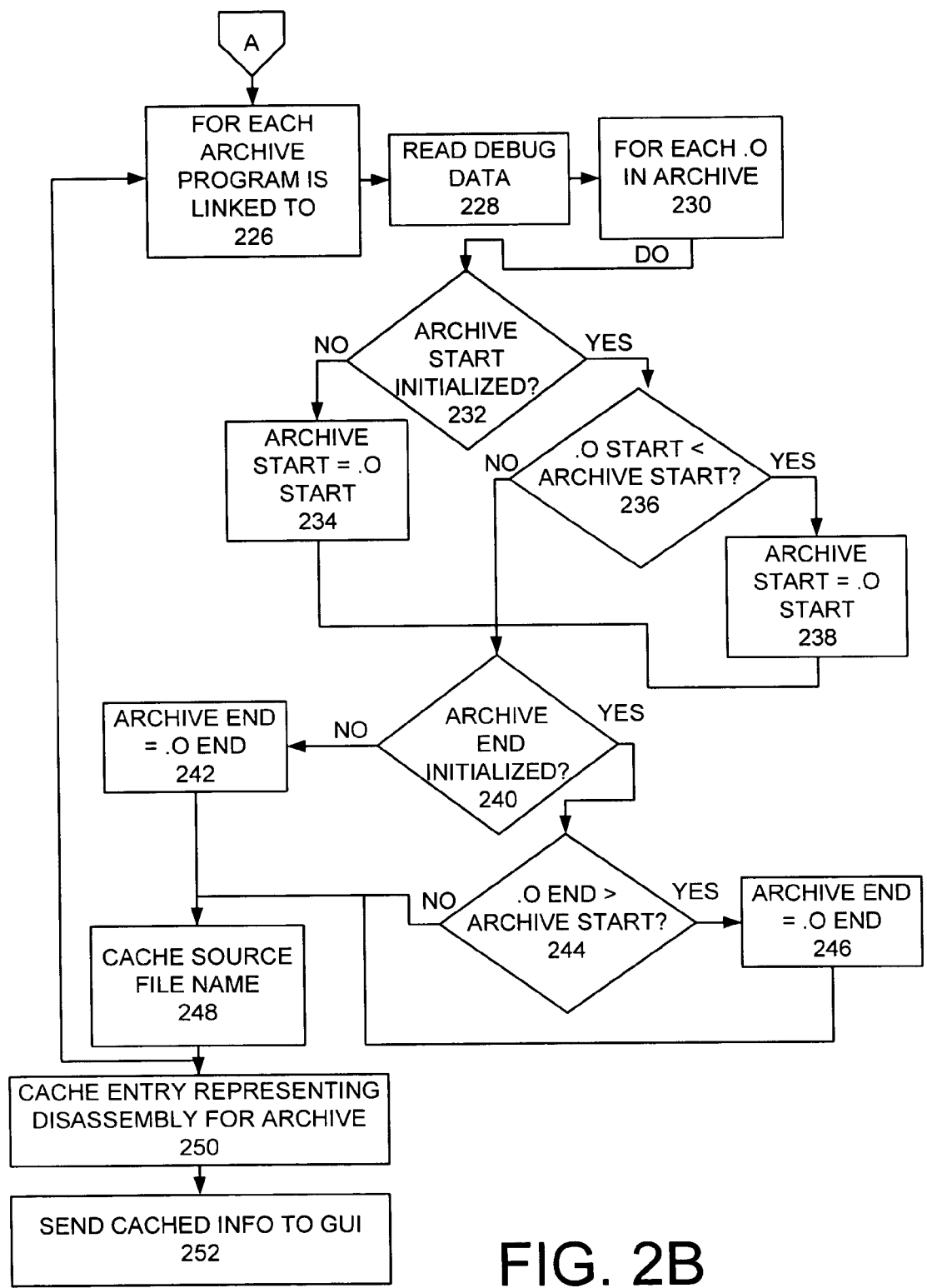
Figure 3:
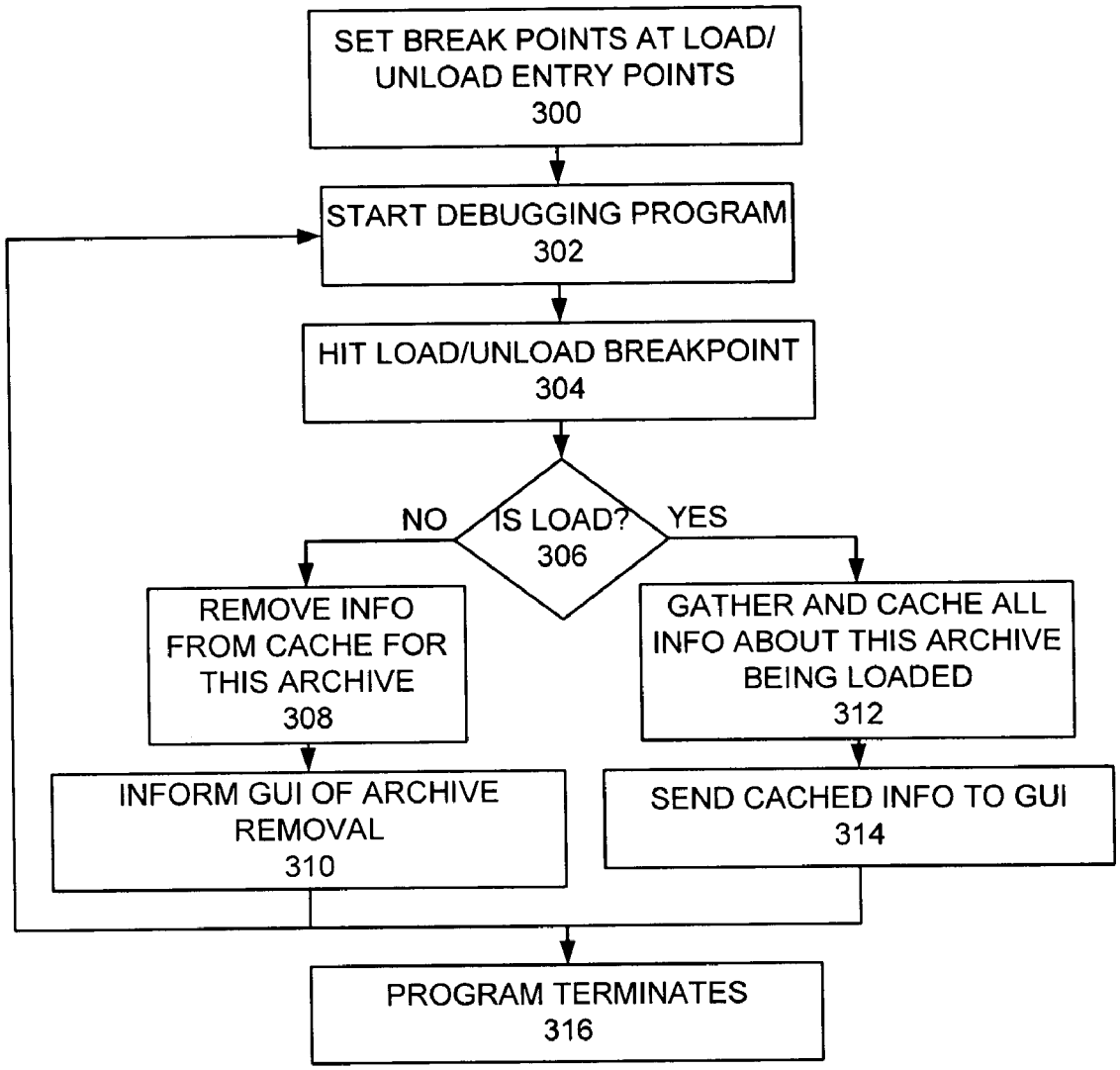

Referring now to FIGS. 2A, 2B and 3, there are shown exemplary steps for implementing a loadmap function of loadmap display manager 140 to generate the enhanced graphical user interface 138 in accordance with the preferred embodiment.

In FIG. 2A, a computer program 132 is placed under debugger 134 as indicated in a block 200. Debug data for the main program 132 under debug are read as indicated in a block 202. For each object, .O, in the main program as indicated in a block 204 processing is performed to identify address ranges for each source file and disassembly file of the main program. Checking for main start initialized is performed as indicated in a decision block 206. If main start is not initialized, main start is set to .O start as indicated in a block 208. If main start is initialized, checking whether .O start is less than main start as indicated in a decision block 210. If .O start is less than main start, then main start is set to .O start as indicated in a block 208. After setting main start to .O start at block 208 or 210, and when .O start is not less than main start, then checking whether main end is initialized as indicated in a decision block 214. If main end is not initialized, main end is set to .O end as indicated in a block 216. When main end is initialized, then checking whether O end is greater than main end is performed as indicated in a decision block 218. If .O end is greater than main end, then main end is set to .O end as indicated in a block 220. When .O end is not greater than main end or after main end is set to .O end at block 216 or 220, then a source file name is cached as indicated in a block 222. An entry representing disassembly for the main program is cached as indicated in a block 224 and a next object in the main program is processed. Then sequential operations continue following entry point A in FIG. 2B to add information to the loadmap of all other objects or archive programs bound to the main program 132 at run time.

In FIG. 2B, as indicated in a block 226 for each archive program linked to by the main program, debug data are read as indicated in a block 228. For each object, .O, in the archive program as indicated in a block 230 processing is performed to identify address ranges for each archive program. Checking for archive start initialized is performed as indicated in a decision block 232. If archive start is not initialized, archive start is set to .O start as indicated in a block 234. If archive start is initialized, checking whether .O start is less than archive start as indicated in a decision block 236. If .O start is less than archive start, then archive start is set to .O start as indicated in a block 238. After setting archive start to .O start at block 234 or 238, and when .O start is not less than archive start, then checking whether archive end is initialized as indicated in a decision block 240. If archive end is not initialized, archive end is set to .O end as indicated in a block 242. When archive end is initialized, then checking whether O end is greater than archive end is performed as indicated in a decision block 244. If .O end is greater than archive end, then archive end is set to .O end as indicated in a block 246. Then after archive end is set to .O end at block 242 or 246, and when .O end is not greater than archive end, then a source file name is cached as indicated in a block 248. An entry representing disassembly for the archive program is cached as indicated in a block 250 and a next object in the archive program is processed. Cached information is sent to GUI 142 as indicated in a block 252.

Referring to FIG. 3, breakpoints are set in a program 132 under test at each load and unload entry point as indicated in a block 300. Upon execution of a program 132 under test, processing of that program is temporarily suspended when the load or unload breakpoint instruction is executed. Debugging the program is started as indicated in a block 302. A load or unload breakpoint is hit as indicated in a block 304. Checking whether the breakpoint is a load breakpoint is performed as indicated in a decision block 306. If a load breakpoint is not identified, then all information about this archive being unloaded is removed from cache as indicated in a block 308. Then the GUI 138 is notified of the archive removal as indicated in a block 310. If a load breakpoint is identified, then all information about this archive being loaded is gathered and cached as indicated in a block 312. Then the cached information is sent to GUI 138 as indicated in a block 314. The program terminates as indicated in a block 316.

Referring now to FIG. 4, there is shown an exemplary graphical user interface screen generally designated by reference character 400 of the enhanced GUI 138 including the loadmap function of loadmap display manager 140 in accordance with the preferred embodiment. The illustrated exemplary GUI screen 400 includes a loadmap tab 402 of the preferred embodiment that provides a tree format generally indicated by 404 of each object 406 that the loadmap contains. Under the individual object 406 is a list of corresponding source files 408, such as testpgm.C, and a disassembly file 408, such as testpgm.32, that make up that object. Enhanced GUI 138 also displays a source code 412 and a disassembly code 414 of each object 406 and displays an address range associated with the source files 408. With the click of a mouse the user can display source code 412 of any of the source files 408 associated with the loadmap objects. The displayed loadmap information of enhanced GUI 132 enables a user to set a breakpoint within the displayed instance of source code 412, without setting a breakpoint in other instances of the source file 408.

Referring now to FIGS. 5-10, there are shown flow charts illustrating exemplary steps for implementing a custom record display function of custom record display manager 142 to generate the enhanced graphical user interface 138 in accordance with the preferred embodiment.

Figure 5:
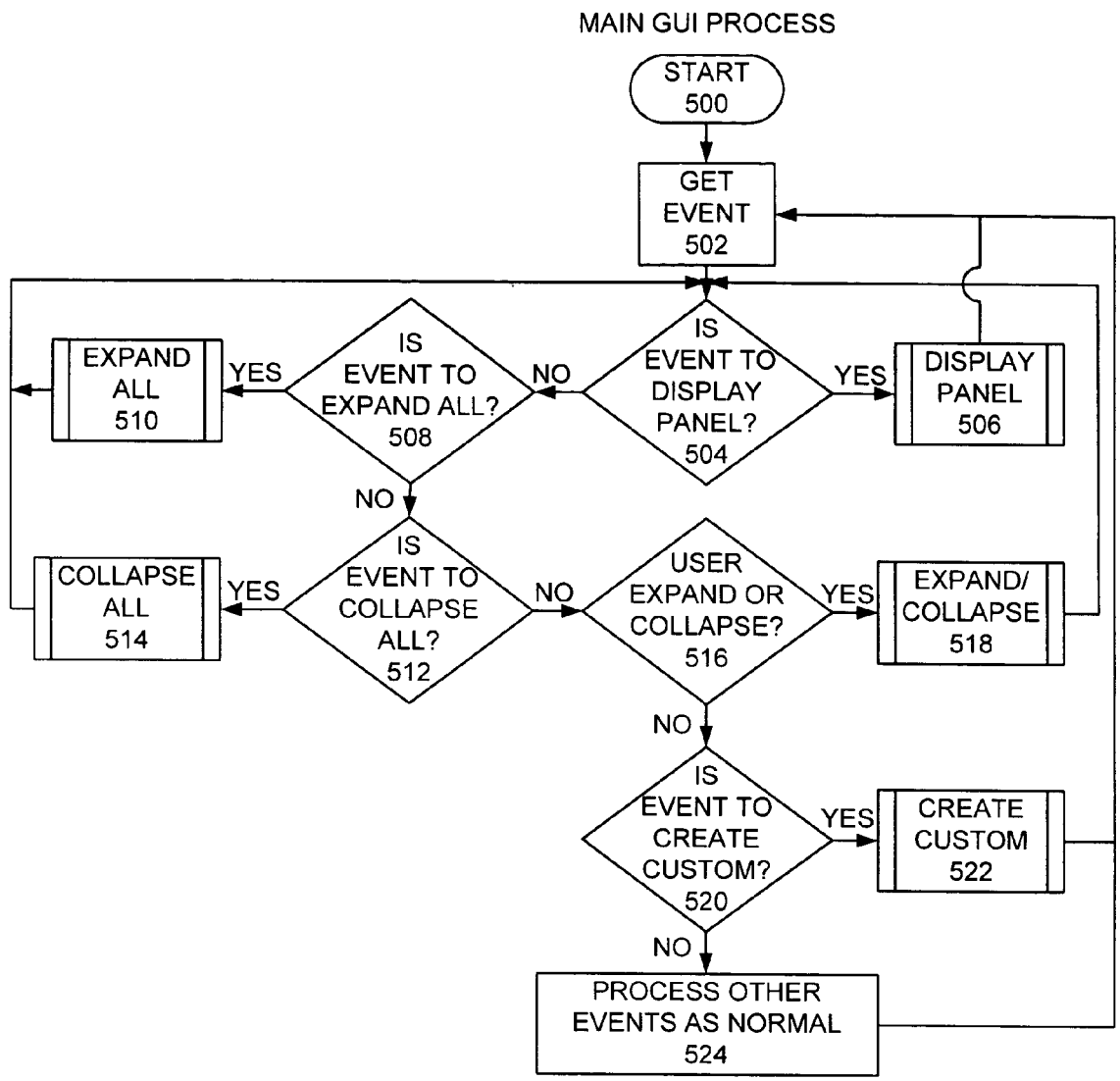
FIGS. 5-10 are flow charts illustrating exemplary steps for implementing a custom structure display function of the enhanced user interface in accordance with the preferred embodiment.
Figure 6:
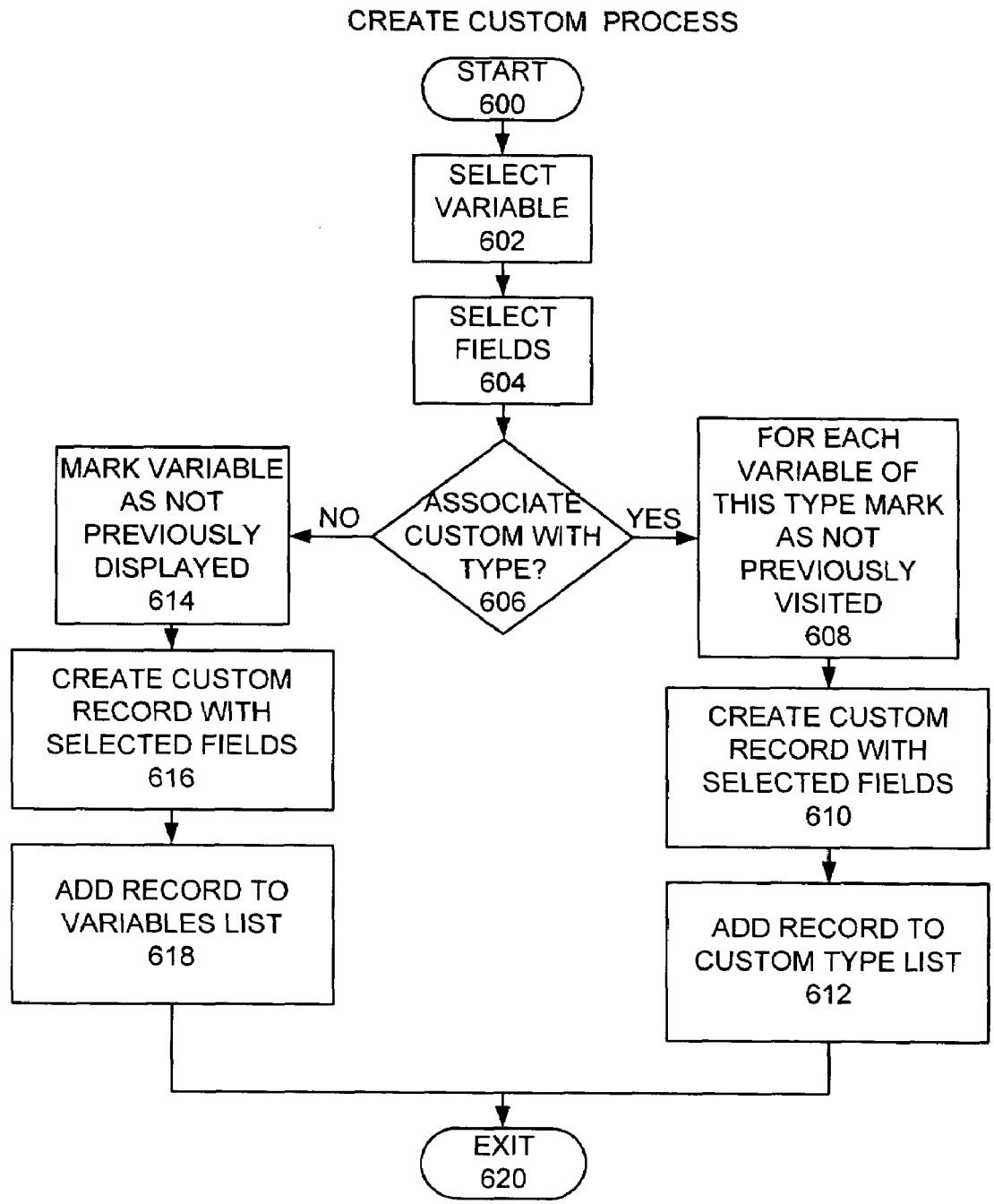
Figure 8:
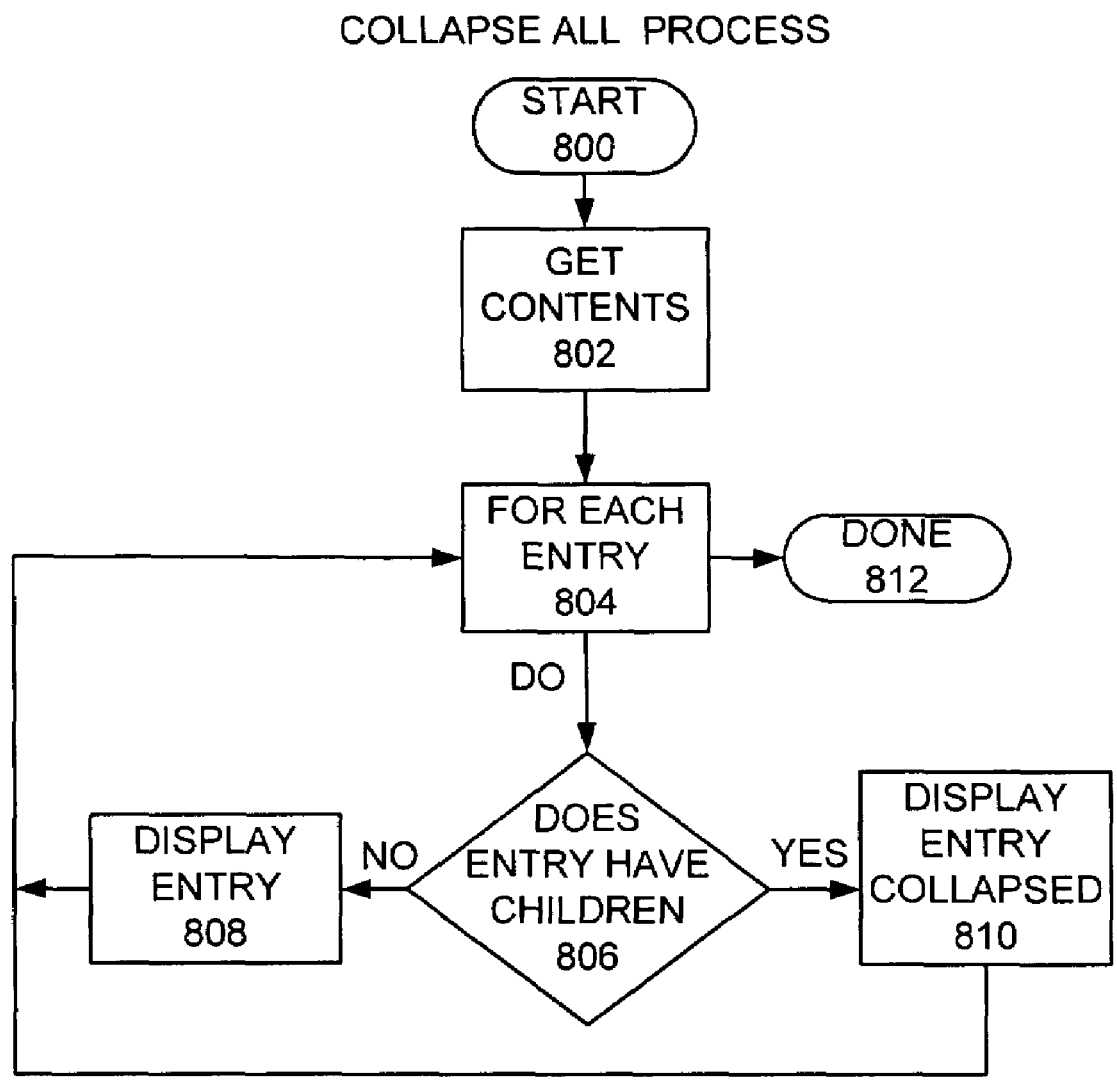
Figure 9:
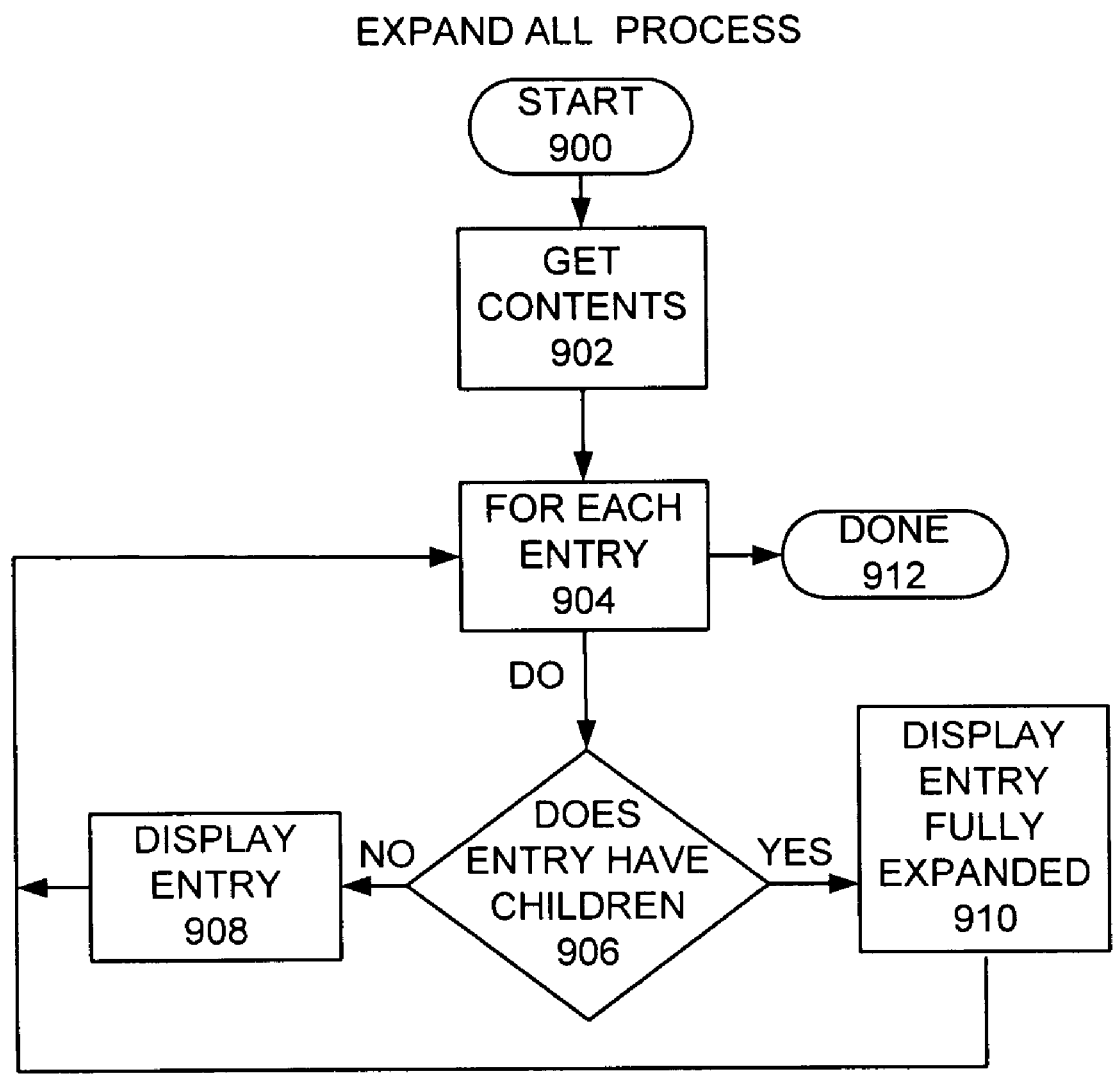
Figure 10:
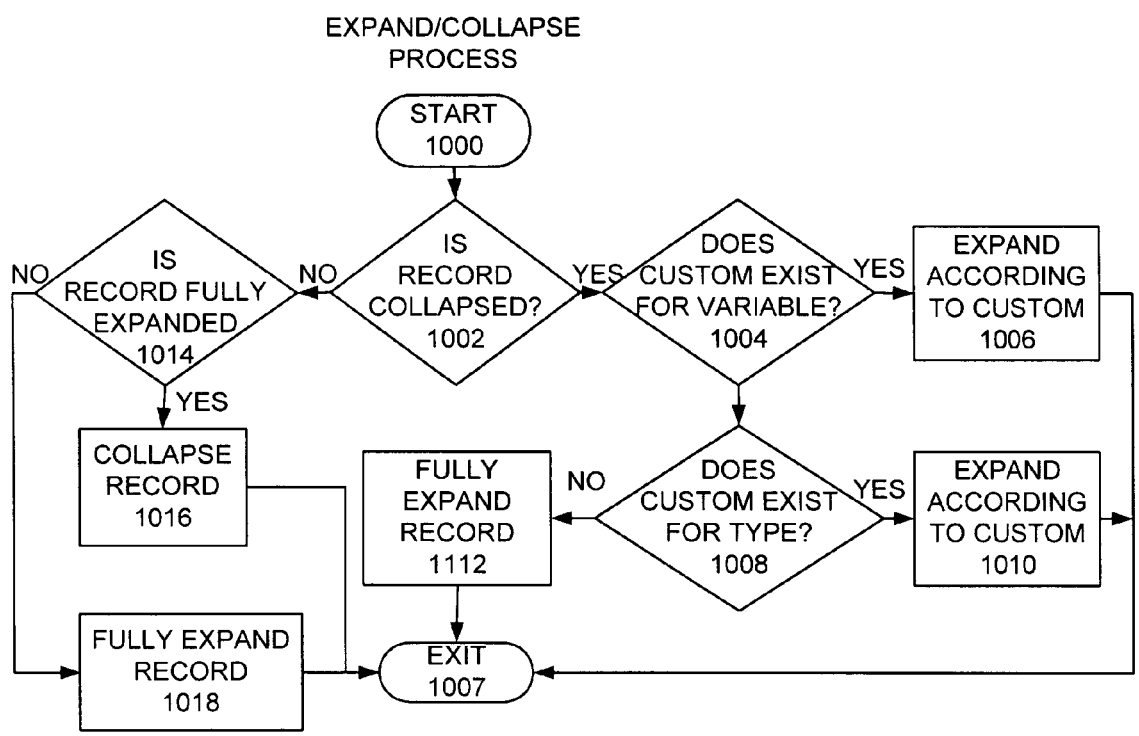

In FIG. 5, sequential operations of a main GUI process start at a block 500. An event is identified as indicated in a block 502. Checking whether the event is to display panel is performed as indicated in a decision block 504. If so, then a display panel routine is performed as indicated in a block 506. The display panel routine is illustrated and described with respect to FIG. 7. Otherwise, checking whether the event is to expand all is performed as indicated in a decision block 508. If the event is to expand all, then an expand all routine, illustrated and described with respect to FIG. 9, is performed as indicated in a block 510. In event is not to expand all, then checking whether the event is to collapse all is performed as indicated in a decision block 512. If the event is to collapse all, then a collapse all routine, illustrated and described with respect to FIG. 8, is performed as indicated in a block 514. In event is not to collapse all, then checking whether the event is a user expand or collapse is performed as indicated in a decision block 516. If the event is a user expand or collapse, then a user expand/collapse routine, illustrated and described with respect to FIG. 10, is performed as indicated in a block 518. In event is not a user expand or collapse, then checking whether the event is to a create custom record is performed as indicated in a decision block 520. If the event is to create custom record, then a create custom routine, illustrated and described with respect to FIG. 6, is performed as indicated in a block 522. If the event is not to create custom structure, then other events are processed as normal.

In FIG. 6, there are shown sequential operations of a create custom process of the preferred embodiment starting at a block 600. A variable is selected by the user as indicated in a block 602. Then the user selects fields for the variable to be displayed as indicated in a block 604. Checking whether the selected variable is associated with a type of variable is performed as indicated in a decision block 606. If the selected variable is associated with a type of variable, then each variable of this type is marked as not previously visited as indicated in a block 610. Then a custom record with the user selected fields is created as indicated in a block 612. The custom record is added to a custom type list as indicated in a block 614. Otherwise, if the selected variable is not associated with a type of variable, then the variable is marked as not previously displayed as indicated in a block 614. Then a custom record with the selected fields is created as indicated in a block 616. The custom record is added to a variable list as indicated in a block 618 and the sequential process is completed as indicated in a block 620.

Figure 7:
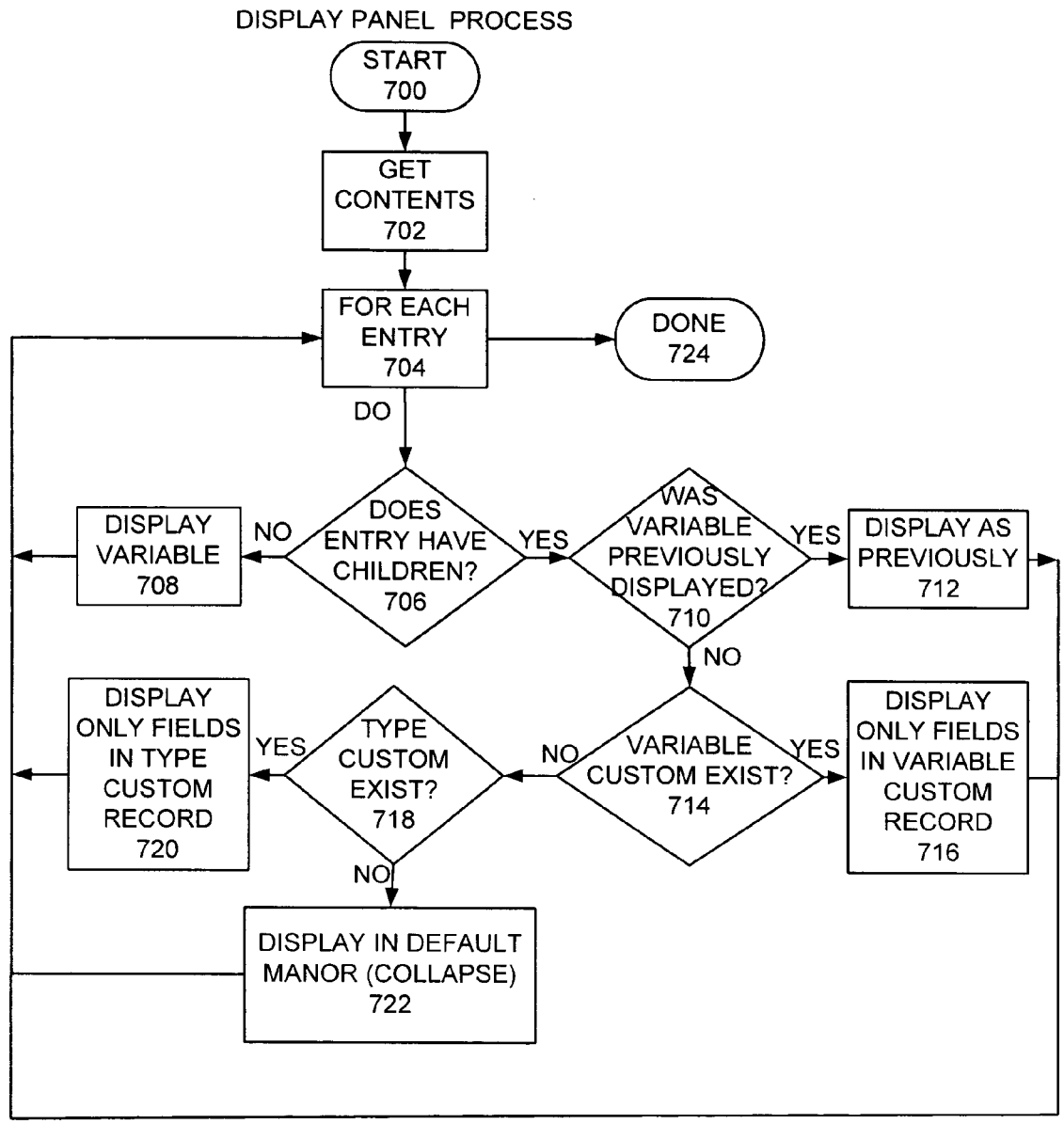

In FIG. 7, sequential operations of a display panel process start at a block 700 and display panel content are identified as indicated in a block 702. Then processing is performed for each entry in the display panel as indicated in a block 604 that starts with checking whether the entry has children as indicated in a decision block 706. If the entry does not have children, then the variable is displayed. If the entry has children, checking whether the variable was previously visited or displayed is performed as indicated in a decision block 710. If previously displayed, then the variable is displayed as previously displayed as indicated in a block 710. Otherwise if not previously displayed, then checking for a custom record for the variable is performed as indicated in a decision block 714. If the variable has a custom record, then the variable is displayed only with the fields in the variable custom record as indicated in a block 716. If no custom record for the variable is identified, then checking whether a custom type for the variable exists as indicated in a decision block 718. If a custom type for the variable exists, then the variable is displayed only with the user selected fields in the variable type custom record as indicated in a block 720. Otherwise, if no custom type for the variable exists, then the variable is displayed in default manor or collapsed as indicated in a block 722.

In FIG. 8, sequential operations of a collapse all process start at a block 800 and display panel content are identified as indicated in a block 802. Then processing is performed for each entry in the display panel as indicated in a block 804 including checking whether the entry has children is performed as indicated in a decision block 806. If the entry does not have children, then the variable is displayed as indicated in a block 808. If the entry has children, then the entry is displayed collapsed as indicated in a block 810.

In FIG. 9, sequential operations of an expand all process start at a block 900 and display panel content are identified as indicated in a block 902. Then processing is performed for each entry in the display panel as indicated in a block 904 including checking whether the entry has children is performed as indicated in a decision block 906. If the entry does not have children, then the variable is displayed as indicated in a block 908. If the entry has children, then the entry is displayed fully expanded as indicated in a block 910.

In FIG. 10, sequential operations of a expand/collapse process start at a block 1000 checking whether the record is collapsed is performed as indicated in a decision block 1002. If the record is collapsed, then checking whether a custom record exists for the variable as indicated in a decision block 1004. If a custom record exists for the variable, then the record is expanded according to the custom record as indicated in a block 1006 and the sequential operations are completed as indicated in a block 1007. If a custom record does not exist for the variable, then checking whether a custom type record exists for the variable as indicated in a decision block 1010. If a custom type record exists for the variable, then the record is expanded according to the custom type record as indicated in a block 1012 to complete the sequential operations at block 1007. Otherwise, if no custom type record exists for the variable, then the record is fully expanded as indicated in a block 1112 to complete the sequential operations at block 1007. If determined at decision block 1002 that the record is not collapsed, then checking whether the record is fully expanded as indicated in a decision block 1014. If the record is fully expanded, then the record is collapsed as indicated in a block 1016 to complete the sequential operations at block 1007. Otherwise if the record is fully expanded, then the record is fully expanded as indicated in a block 1018 to complete the sequential operations at block 1007.

Figure 11:
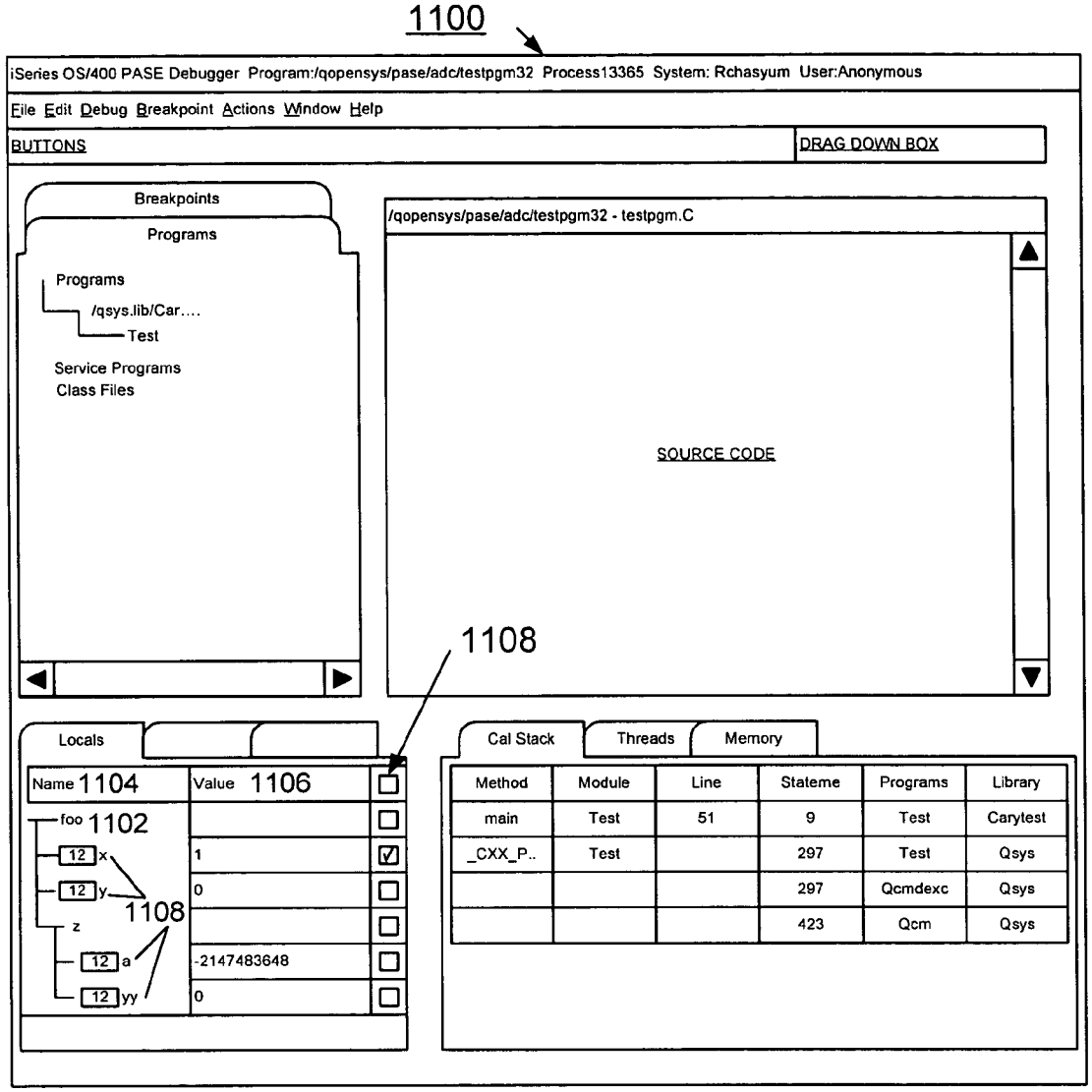
FIG. 11 illustrates an exemplary graphical user interface including setup options for the custom structure display function in accordance with the preferred embodiment.

Referring now to FIG. 11, there is shown an exemplary graphical user interface screen generally designated by reference character 1100 of GUI 138 including setup options for the custom record display function of the custom record display manager 142 in accordance with the preferred embodiment. To initiate the custom structure display function the user first selects a variable of the type to be customized or programmed, for example, using a context menu selects a Type Setup option. For example, the user selects a variable 1102, shown as variable for which is a type of test class. Then as shown in the exemplary graphical user interface screen 1100 of GUI 138 each variable has a name 1104 and value 1006, and the selected variable for, 1102 is displayed fully expanded with multiple fields 1008 and check boxes 1008 appear next to each of the fields of the variable structure. The user checks the fields via check boxes 1008 that are to be displayed for the selected variable 1102, and then, for example, opens the context menu again and the option on the context menu says Apply Type Setup. After this Apply Type Setup option is selected all variables of the type, such as test class, will be displayed by the rules just established.

Figure 12:
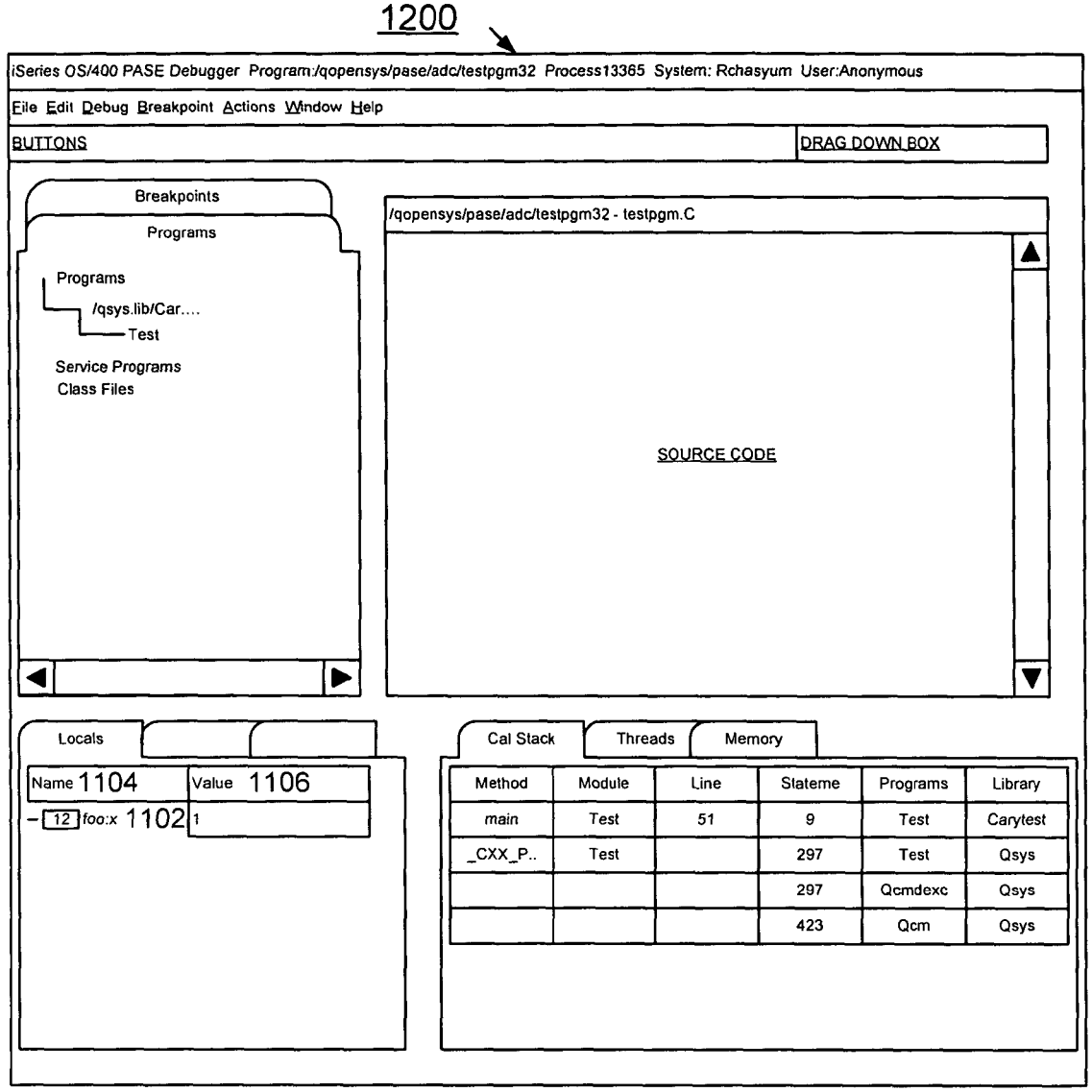
FIG. 12 illustrates an exemplary graphical user interface including an exemplary custom structure display function resulting from the illustrated user selection of FIG. 11 in accordance with the preferred embodiment.

Referring now to FIG. 12, there is shown an exemplary graphical user interface screen generally designated by reference character 1200 of GUI 138 including an exemplary custom structure display function resulting from the illustrated user selection of FIG. 11 in accordance with the preferred embodiment. As shown, the selected variable for, 1102 is displayed with the value 1106 of only field 12, x, 1008 displayed.

In addition to selecting which fields 1008 to display the programmer can also override the field name, or specify that a single value should be displayed after the structure. Also, any options, such as ASCII or HEX, that are active when the Apply Type Setup option is selected are remembered and used for other variables of this type. When base class members are included in a variable expansion, and a variable of the base classes type has been customized or programmed, only the fields specified at that time will be included.

The user can override this for the particular type by programming that type to include or exclude more of the base class fields. This programmed information can also be saved in an environment file to be used each time the debugger 134 is run.

Figure 13:
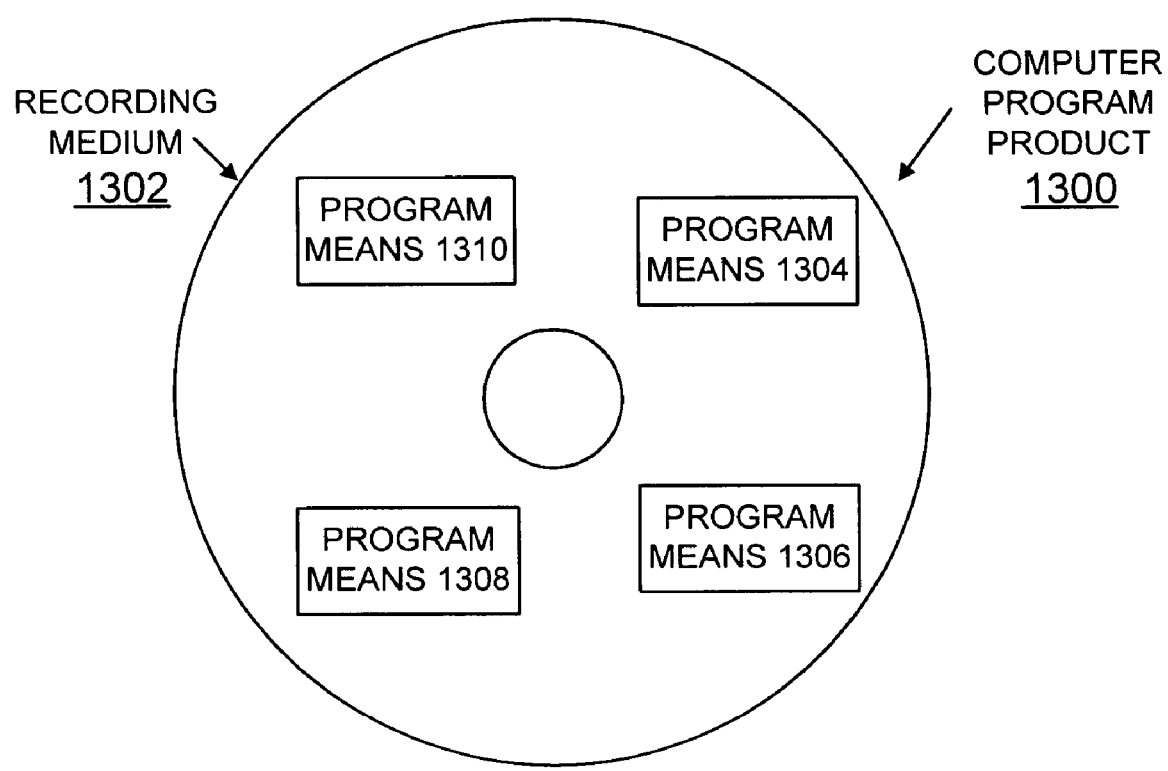
FIG. 13 is a block diagram illustrating a computer program product in accordance with the preferred embodiment.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, a transmission type media such as a digital or analog communications link, or a similar computer program product. Recording medium 1302 stores program means 1304, 1306, 1308, 1310 on the medium 1302 for carrying out the methods for implementing the enhanced graphical user interface features of the preferred embodiment in the system 100 of FIG. 1.

A sequence of program instructions or a logical assembly of one or more interrelated modules defined by the recorded program means 1304, 1306, 1308, 1310, direct the computer system 100 for implementing the enhanced graphical user interface features of the preferred embodiment.

While the present invention has been described with reference to the details of the embodiments of the invention shown in the drawing, these details are not intended to limit the scope of the invention as claimed in the appended claims.

What is claimed is:

1. Apparatus for implementing enhanced graphical user interface functions in a graphical debugger in a computer system, said graphical debugger for identifying errors in a program under debug, said graphical debugger including instructions stored on a computer readable storage medium, said instructions when executed by the computer system cause the computer system to implement functions comprising:

a user interface operatively controlling a graphical user interface;

a loadmap display manager coupled to said user interface implementing a loadmap function; said loadmap display manager generating a list of program objects being bound to the program under debug at runtime;

said user interface responsive to said loadmap display manager, displaying a program loadmap including said generated list of program objects being bound to the program under debug at runtime;

a custom record display manager coupled to said user interface receiving user inputs and implementing a custom record display function; and said user interface responsive to said custom record display manager, displaying user selected customized records.

2. Apparatus for implementing enhanced graphical user interface functions as recited in claim 1 further includes a debugger server and wherein said loadmap display manager operatively controls said debugger server for implementing said loadmap function.

3. Apparatus for implementing enhanced graphical user interface functions as recited in claim 2 wherein said load map function includes debugger means reading debug data for the program under debug; examining the program debug data, generating a list of each source and disassembly file contained in the program under debug, and for generating said list of program objects bound to the program under debug at run time to generate said program loadmap for display.

4. Apparatus for implementing enhanced graphical user interface functions as recited in claim 3 wherein said load map function further includes debugger means for identifying program load and unload events, and for dynamically updating said program loadmap for display as loadmap information changes responsive to program load and unload events; whereby said program loadmap enables setting a breakpoint within a user selected address range for one instance of a source file, without setting the breakpoint in other instances of the source file.

5. Apparatus for implementing enhanced graphical user interface functions as recited in claim 2 wherein said custom record display manager operatively controls said debugger server for implementing said custom record display function; and said custom record display function includes debugger means for identifying a user selected variable, and user selected fields of the variable to be displayed.

6. Apparatus for implementing enhanced graphical user interface functions as recited in claim 5 wherein said custom record display function further includes debugger means for identifying a user selected all variables of this type to be customized, for creating a custom record with the user selected fields and for adding said created custom record to a custom type list for displaying user selected customized records for all variables of this type only with the user selected fields.

7. Apparatus for implementing enhanced graphical user interface functions as recited in claim 5 wherein said custom record display function further includes debugger means for creating a custom record with the user selected fields and for adding said created custom record to a variables list for displaying the variable only with the user selected fields.

8. A debugger computer program product for implementing enhanced graphical user interface functions in a computer system, said debugger computer program product for identifying errors in a program under debug and including instructions stored on a computer readable storage medium, said instructions when executed by the computer system to cause the computer system to perform the steps of:

reading debug data for the program under debug;

examining said program debug data, generating a list of each source and disassembly file contained in the program under debug, and generating a list of each program object being-bound to the program under debug at run time to generate a program load map for display; and displaying said generated program loadmap on a graphical user interface; and dynamically updating said program loadmap for display as loadmap information changes during run time of the program under debug.

9. A debugger computer program product for implementing enhanced graphical user interface functions as recited in claim 8 includes the step of identifying program load and unload events, and dynamically updating said program loadmap for display responsive to program load and unload events.

10. A debugger computer program product for implementing enhanced graphical user interface functions as recited in claim 9 wherein the step of identifying program load and unload events includes the steps of setting breakpoints at program load and unload entry points in the program under debug; and when debugging said program, identifying an unload breakpoint; and removing all information for an archive program being unloaded from said program loadmap to provide a current program loadmap, and displaying said current program loadmap.

11. A debugger computer program product for implementing enhanced graphical user interface functions as recited in claim 8 includes the step of identifying a user selected variable and identifying user selected fields of the variable to be displayed, and creating a custom record with the user selected fields.

12. A debugger computer program product for implementing enhanced graphical user interface functions as recited in claim 11 includes the step responsive to a user selection of all variables of this type to be customized, adding said created custom record to a custom type list for displaying user selected customized records for all variables of this type only with the user selected fields.

13. A debugger computer program product for implementing enhanced graphical user interface functions as recited in claim 11 includes the step adding said created custom record to a variables list for displaying the variable only with the user selected fields.

14. A debugger computer program product for implementing enhanced graphical user interface functions in a computer system, said debugger computer program product for identifying errors in a program under debug and including instructions stored on a computer readable storage medium, said instructions when executed by the computer system to cause the computer system to perform the steps of:

generating a list of program objects being bound to the program under debug at runtime;

displaying a program loadmap including said generated list of program objects;

identifying a user selected variable and identifying user selected fields of the variable to be displayed, creating a custom record with the user selected fields; and displaying the variable only with the user selected fields.

15. A debugger computer program product for implementing enhanced graphical user interface functions as recited in claim 14 wherein the step of displaying the variable only with the user selected fields includes the step adding said created custom record to a variables list for displaying the variable only with the user selected fields.

16. A debugger computer program product for implementing enhanced graphical user interface functions as recited in claim 14 includes the step of identifying a user selection of all variables of this type to be customized, adding said created custom record to a custom type list for displaying user selected customized records for all variables of this type only with the user selected fields.

17. A method for implementing enhanced graphical user interface functions in a graphical debugger in a computer system, said graphical debugger for identifying errors in a program under debug and including instructions stored on a computer readable storage medium, said instructions when executed by the computer system to cause the computer system to perform the steps of:
  utilizing a load map display manager for implementing a loadmap function and generating a list of program objects being bound to the program under debug at runtime to generate a program loadmap for the program under debug;
  displaying said generated program loadmap responsive to said loadmap function;
  utilizing a custom record display manager for receiving user inputs and implementing a custom record display function; and
  displaying user selected customized records responsive to said custom record display function.

18. A method for implementing enhanced graphical user interface functions in a graphical debugger as recited in claim 17 wherein the step of utilizing a loadmap display manager for implementing a loadmap function and generating a program loadmap for a program under debug includes the steps of reading debug data for the program under debug; examining said program debug data, generating a list of each source and disassembly file contained in the program under debug, and generating a list of each program object bound to the program under debug at run time to generate said program loadmap for display; and displaying said generated program loadmap on a debugger graphical user interface.

19. A method for implementing enhanced graphical user interface functions in a graphical debugger as recited in claim 18 includes the steps of identifying program load and unload events, dynamically updating said program loadmap and displaying said updated loadmap responsive to identified program load and unload events.

20. A method for implementing enhanced graphical user interface functions in a graphical debugger as recited in claim 17 wherein the step of utilizing a custom record display manager for receiving user inputs and implementing a custom record display function includes the steps of identifying a user selected variable and identifying user selected fields of the variable to be displayed, creating a custom record with the user selected fields; and displaying the variable only with the user selected fields.

21. A method for implementing enhanced graphical user interface functions in a graphical debugger as recited in claim 20 includes the steps of identifying a user selection of all variables of this type to be customized, adding said created custom record to a custom type list for displaying user selected customized records for all variables of this type only with the user selected fields.

* * * * *